(12) United States Patent
Fukuoka et al.

(10) Patent No.: US 6,881,455 B2
(45) Date of Patent: Apr. 19, 2005

(54) LIQUID CRYSTAL DISPLAY ELEMENT

(75) Inventors: Nobuko Fukuoka, Saitama-Ken (JP); Takeshi Yamamoto, Saitama-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 49 days.

(21) Appl. No.: 10/050,038

(22) Filed: Jan. 17, 2002

(65) Prior Publication Data
US 2002/0098299 A1 Jul. 25, 2002

(30) Foreign Application Priority Data
Jan. 25, 2001 (JP) ..................................... P2001-017124

(51) Int. Cl.$^7$ ............................................ G02F 1/1337
(52) U.S. Cl. ........................ 428/1.26; 428/1.2; 349/123
(58) Field of Search ................ 428/1.1, 1.2, 1.26–1.28, 428/1.3, 1.31, 1.5; 349/123, 106

(56) References Cited

U.S. PATENT DOCUMENTS 4,593,977 A * 6/1986 Takamatsu et al. ......... 349/162
5,190,794 A * 3/1993 Yoshino et al. ............. 427/162
5,608,033 A * 3/1997 Nihira et al. ................ 528/353
5,629,056 A * 5/1997 Koike et al. .................... 428/1

FOREIGN PATENT DOCUMENTS

JP          11-119225          4/1999

* cited by examiner

Primary Examiner—Harold Pyon
Assistant Examiner—Sow-Fun Hon
(74) Attorney, Agent, or Firm—Pillsbury Winthrop, LLP

(57) ABSTRACT

A liquid crystal display element includes array and counter substrates provided opposite to each other. The array substrate is covered with a color filter layer. Pixel electrodes are provided in a matrix form on the color filter layer. The surface of the counter substrate is provided with a common electrode. Alignment films are coated on the pixel and common electrodes. A gap defined between the array and counter substrates are filled with a liquid crystal material to form a liquid crystal layer. The alignment films are processed to have surface energy within the range from 51 to 60 dyn/cm. Such surface energy substantially prevents an image-sticking phenomenon of the liquid crystal display element caused by impurities dissolved into a liquid crystal layer and white or black turbid spots caused by hydrolysis of the alignment films by moisture in the liquid crystal layer.

2 Claims, 3 Drawing Sheets

LIQUID CRYSTAL DISPLAY ELEMENT

BACKGROUND OF THE INVENTION

1. Field of the Invention

The present invention relates to a liquid crystal display element and, more particularly, to a liquid crystal display element to display a high quality image by substantially preventing deterioration in the display dignity due to uneven display, white or black turbid spots.

2. Description of the Related Art

A color liquid crystal display element has a color filter layer made of a resin layer coated on either of an array substrate. The Array substrate includes a plurality of pixel electrodes connected to a driving element. Another substrate provided opposite to the array substrate is provided with an opposite electrode. A gap defined between the two substrates is charged with a liquid crystal composition. Conventionally, alignment films are formed on the surfaces of the substrates, respectively, in contact with the liquid crystal composition to orientate or align liquid crystal molecules of the liquid crystal composition in predetermined directions.

However, since the resin layer used for the color filter layer in such a liquid crystal display element contains impurities, the impurities are dissolved in the liquid crystal layer to cause an image-sticking phenomenon and defective display so that the display dignity is lowered remarkably. On the other hand, since the alignment films of the liquid crystal display is in direct contact with the liquid crystal layer, the alignment layers are hydrolyzed due to moisture contained in the liquid crystal layer or moisture soaking from the outside. Such hydrolysis causes white or black turbid spots and defects on the image display so that the display dignity is lowered too.

SUMMARY OF THE INVENTION

A first object of the present invention is to solve the aforementioned problems.

A second object of the present invention is to provide a high display dignity liquid crystal display element.

A third object of the present invention is to provide a liquid crystal display element to prevent defective display due to elution of impurities into the liquid crystal layer and inclusion of moisture therein.

One aspect of a liquid crystal display element in accordance with the present invention, as means for solving the aforementioned problems, includes a pair of substrates provided opposite to each other. An electrode is disposed on either of the substrates. A resin layer is formed on the surface of at least either of the pair of substrates. Alignment films are coated over the surfaces of the substrates. The alignment films each have surface energy of 51 to 60 dyn/cm. A liquid crystal composition charged in the gap between the pair of substrates with the electrode and the alignment films provided.

With the aforementioned surface energy of the alignment films, the present invention can provide a highly reliable liquid crystal display element with good display dignity because the present invention prevents impurities from the resin layer from concentrating in predetermined parts of the alignment films so as to suppress an image-sticking and defects, and because the present invention also prevents adhesion of moisture to the alignment films to suppress white or black turbid spots and other defective display.

The above-stated and other objects and advantages of the invention will become apparent from the following description when taken with the accompanying drawings. It will be understood, however, that the drawings are for purposes of illustration and are not to be construed as defining the scope or limit of the invention, reference being had for the latter purpose to the claims appended hereto.

BRIEF DESCRIPTION OF THE DRAWINGS

FIG. 2(a) schematically illustrates the suspension condition of impurities before application of voltage;

FIG. 2(b) schematically illustrates the concentration of impurities on the voltage applied part;

DETAILED DESCRIPTION OF THE INVENTION

Figure 1:
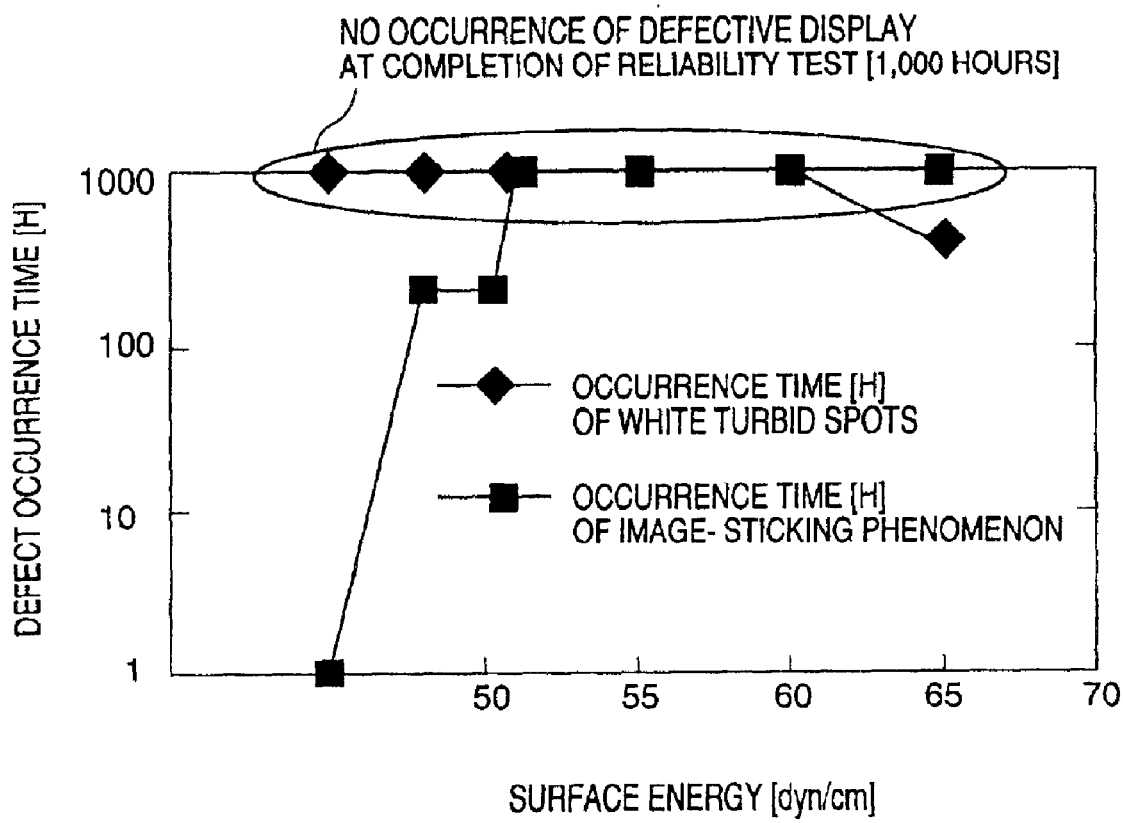
FIG. 1 is a graph showing the principle of the present invention with respect to the occurrence of defective display depending on the surface energy of alignment films.

Firstly, the principle of the present invention will be described. A reliability test has been carried out to analyze causes of defective display due to impurities and/or moisture in a liquid crystal display element provided with a color filter. For that purpose the liquid crystal display element has displayed a black-and-white checker image 10 mm square on its screen for 1000 hours. There has been investigated the relationship between the surface energy of polyimide alignment films and defective display such as an image-sticking phenomenon and white and black turbid spots. The test results are shown in FIG. 1.

Namely, where the surface energy of the polyimide alignment film has been 50 dyn/cm or less, pixels of the liquid crystal display element have been incapable of displaying due to an image-sticking phenomenon before the display time has reached 1000 hours and the display dignity has been lowered remarkably. On the other hand, where the surface energy of the polyimide alignment film has been more than 60 dyn/cm, white turbid and black spots have appeared on the display of the liquid crystal display element before the display time has reached 1000 hours and the display dignity has been lowered remarkably, too.

The analyses of defective display mechanism are as follows:

(1) Where the color filter layer is provided in the liquid crystal display element, impurities contained in the color filter layer are dissolved in the liquid crystal layer.

Figure 2A:
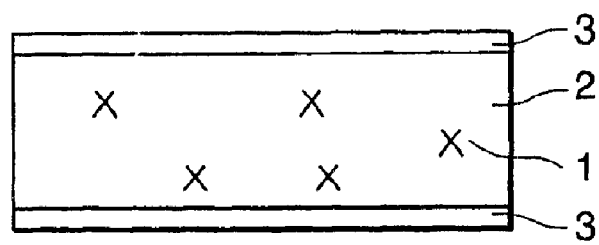
FIGS. 2(a) and 2(b) schematically illustrate a mechanism of a image-sticking phenomenon.

(2) Where the surface energy of the polyimide alignment films formed on the liquid crystal display element is low, impurities 1 dissolved from the color filter layer are dispersed and suspended in a liquid crystal layer 2 before voltage application as shown in FIG. 2(a).

Figure 2B:
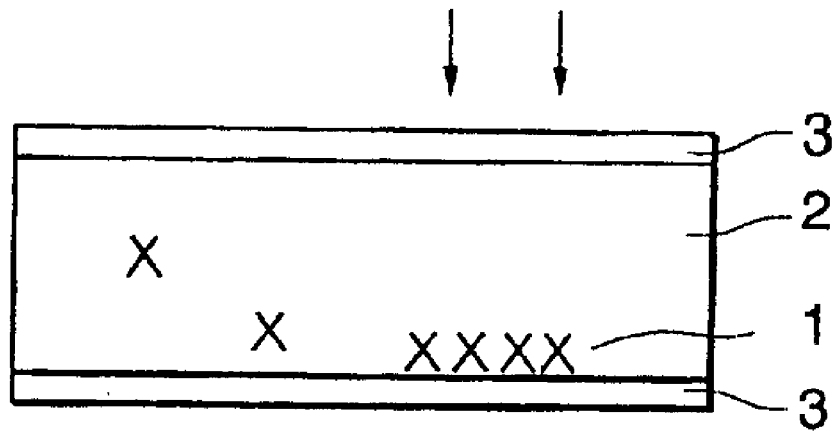

(3) When a voltage is applied at the time of image display, impurities are locally concentrated on the alignment films 3 as shown in FIG. 2(b) and causes an image-sticking phenomenon.

Figure 3:
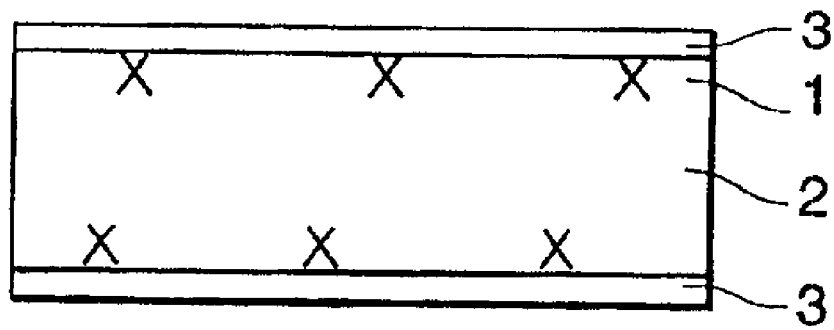
FIG. 3 is an illustration showing the trapping condition of impurities due to an alignment film with high surface energy in accordance with the present invention.

Then, where the surface energy of the alignment films is increased for the purpose of preventing the image-sticking phenomenon, the impurities 1 dissolved in the liquid crystal layer 2 are trapped on the surfaces of the alignment films 3 almost uniformly as shown in FIG. 3. As a result, no impurities are concentrated locally even at the time of voltage application and, thus, no image-sticking phenomenon is caused. However, the alignment films 3 with such high surface energy also trap moisture contained in the liquid crystal layer 2 or soaking from the outside. Thus, the surfaces of the alignment films 3 are hydrolyzed by such trapped moisture. Where the surface energy of the alignment films is more than 60 dyn/cm as shown in FIG. 1, white or black turbid spots appear during a long period of display time.

Therefore, the present invention controls the surface energy of the alignment films within the range from 51 to 60 dyn/cm to prevent from causing defective display due to an image-sticking phenomenon and white or black turbid spots.

With respect to the surface energy of the alignment film, a measured value is obtained by a method of dropping a waterdrop on the alignment film and measuring a contact angle between the waterdrop and the alignment film.

Figure 4:
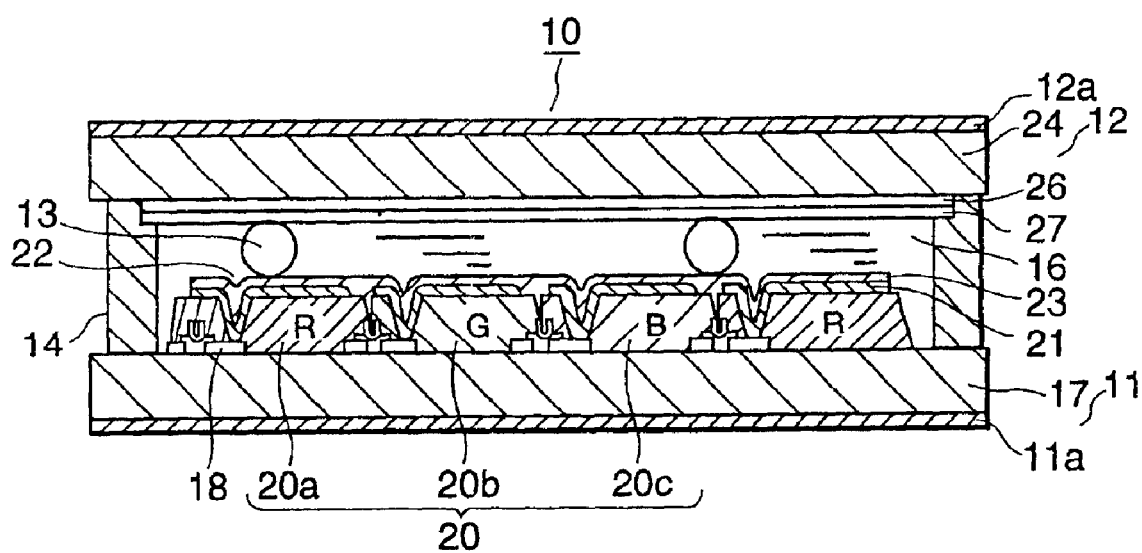
FIG. 4 shows schematically a cross sectional view of a liquid crystal display element in accordance with the present invention.

Next, on the basis of the aforementioned principle, the present invention will be explained with reference to the accompanying drawing. FIG. 4 shows schematically a cross section of a liquid crystal display element 10. The liquid crystal display element 10 includes an array substrate 11 and a counter substrate 12 provided opposite to the array substrate via ball-like spacers 13. The periphery of the liquid crystal display element is bonded and sealed by a sealing agent 14 made of a thermosetting epoxy series adhesive ES-550 (made by Mitsui Toatsu Kagaku, Ltd.). A liquid crystal composition 16 is injected into a gap defined between the substrates 11 and 12 from an injection port of the periphery and then the injection port is sealed. Polarization plates 11a and 12a are additionally put to the array and counter substrates 11 and 12 formed on the glass 24, respectively.

The array substrate 11 has a thin film transistor (TFT) element 18 for driving the liquid crystal. The TFT element 18 is provided in the neighborhood of the intersection point of a scanning line and a signal line (not shown in the drawing) formed on a glass substrate 17. A color filter layer 20 made of color layers 20a, 20b, and 20c of R (red), G (green), and B (blue) are provided adjacent to, and partially on the TFT element 18 in a stripe shape.

A plurality of pixel electrodes 21 are patterned in a matrix form on the color filter layer 20. The pixel electrodes 21 are connected to a source electrode (not shown in the drawing) of the TFT element 18 via through holes 22 formed in the color filter layer 20. Further, an alignment film 23 with surface energy of 53.5 dyn/cm is formed on the pixel electrodes 21.

A common electrode 26 made of an indium tin oxide (ITO) film is formed on the counter substrate 12. An alignment film 27 with surface energy of 53.5 dyn/cm is formed on the common electrode 26.

Next, a manufacturing method of the liquid crystal display element 10 will be described hereinafter. With respect to the array substrate 11, the TFT element 18 is formed on the glass substrate 17 by repeating a patterning in an ordinary photolithographic step. As a color layer material, an ultraviolet curing (setting) acrylic resin resist CR-2000 (made by Fuji Hunt Technology, Ltd.) with a red pigment dispersed is coated overall on the substrate 17 by a spinner. Light with a wave length of 356 nm is irradiated onto the part to be colored red with 100 mJ/cm2 via a photo-mask. Then, the part is developed in a solution of 1% of KOH for 10 seconds so that a color R (red)) layer 20a is formed.

Color G (green) and B (blue) layers 20b and 20c are formed In the same way as set forth above. As color layer materials of the color G (green) and B (blue) layers 20b and 20c, ultraviolet curing acrylic resin resists CG-2000 and CB-2000 with green and blue pigments dispersed, respectively, manufactured by Fuji Hunt Technology, Ltd. are used. After the color filter layer 20 is formed, an ITO film with a thickness of 1500 Å is deposed by a sputtering process and its patterning is carried out by a photolithographic step so that the pixel electrodes 21 can be provided on the color filter layer 20 in a matrix form. Further, the alignment film 23 is coated on the pixel electrodes.

On the other hand, with respect to the counter substrate 12, an ITO film with a thickness of 1500 Å is formed on the glass substrate 24 by such a sputtering process, the common electrode 26 is formed, and then an alignment film 27 is coated on the common electrode 26.

Next, the alignment films 23 and 27 will be described. A polyimide alignment film material of SE-7492 (made by Nissan Kagaku Kogyo, Ltd.) is dropped on the pixel electrodes 21 on the side of the array substrate 11 and the common electrode 26 on the side of the counter substrate 12 to carry out spin coatings, respectively. The overall pixel electrodes 21 and 26 are coated with the polyimide alignment films with a thickness of 500 Å by such a spin coating, respectively. Further, the alignment films 23 and 27 are baked at 180° C. for one hour to set their surfaces at energy of 53.5 dyn/cm.

The surface energy varies with the material of alignment films and process conditions. Where, for example, the baking temperature is high and the baking time is long, the surface energy increases. In this embodiment, the surface energy is controlled by primarily selecting the material of alignment films and process conditions.

Thereafter, the alignment films 23 and 27 are orientated or aligned by the well known method of rubbing. The sealing agent 14 is coated along the periphery of the alignment film 23 of the array substrate 11. A transfer material (not shown in the drawing) for applying a voltage to the common electrode 26 substrate 11 is formed around the sealing agent 14. After the ball-like spacers 13 are spread on the array substrate 12, the array substrate 11 and the counter substrate 12 are provided opposite to each other so as to set the rubbing direction of each of the alignment films 23 and 27 at 90°. The sealing agent 14 is, then, heated and cured. Thus, liquid crystal cells are formed.

Next, a liquid crystal composition of 16ZLI-1565 (made by E. Merk GmbH.) with chiral material of 0.1 wt % added is injected into the gap of the liquid crystal cells through the injection port. Then, the injection port (not shown in the drawing) is sealed by ultraviolet curing resin. The polarization plates 11a and 12a are put to the array substrate 11 and the counter substrate 12 so that the liquid crystal display element 10 is completed.

A continuous image display test has been made for the liquid crystal display element 10 manufactured in this way at a high temperature of 50° C. and high humidity of 80% for 1000 hours by using a black-and-white checker image 10 mm square. As a result, neither image-sticking phenomenon nor white or black turbid spots have appeared, and a good quality display image has been obtained.

With such a structure of the liquid crystal display element, since the surface energy of the alignment films 23 and 27 is high, e.g., 53.5 dyn/cm, impurities dissolved into the liquid crystal composition 16 from the color filter layer 22 are trapped by the alignment films 23 and 27 almost uniformly.

As a result, a image-sticking or seizing phenomenon can be prevented regardless of image display for a long period of time. Further, since the surface energy of the alignment films 23 and 27 is not too high and moisture in the liquid crystal composition 16 is not trapped, the alignment films 23 and 27 are not hydrolyzed, even under the condition of a high temperature and high humidity, and white or black turbid spots can be prevented. Therefore, the liquid crystal display element 10, although the color filter layer 22 includes impurities, such impurities do not adversely affect the display image quality. The defective display due to a image-sticking or seizing phenomenon and white or black turbid spots are substantially prevented, and high display dignity can be obtained.

Comparison Example 1

Further, comparison example 1 will be described. Although the alignment films 23 and 27 have the surface energy of 53.5 dyn/cm in the aforementioned embodiment, alignment films in comparison example have lower surface energy of 50.4 dyn/cm, provided, however, that the pixel and common electrodes and the other conditions are exactly the same as those of the aforementioned embodiment. The alignment films with the surface energy of 50.4 dyn/cm in comparison example 1 are obtained by coating a polyimide alignment film material of SE-7492 (made by Nissan Kagaku Kogyo, Ltd.) on the surfaces of the pixel and common electrodes and then by baking them at 220° C. for one hour.

A continuous image display test has been carried out for the liquid crystal display element of the comparison example 1 (the alignment films having surface energy of 50.4 dyn/cm) at high temperature of 50° C. and humidity of 80% for 1000 hours by using a black-and-white checker image 10 mm square in the same way as for the aforementioned embodiment. Since the surface energy of the alignment films is lower than the embodiment, the display has been defective due to an image-sticking phenomenon after about 110 hours and the display dignity has been extremely lowered.

Comparison Example 2

Next, comparison example 2 will be described. In comparison example 2, alignment films have high surface energy of 62 dyn/cm, the pixel and common electrodes and the other conditions are exactly the same as those of the aforementioned embodiment. The alignment films having surface energy of 62 dyn/cm in comparison example 2 are obtained by coating polyimide alignment film materials of SE-7492 (made by Nissan Kagaku Kogyo, Ltd.), on the surfaces of the pixel and common electrodes and then by baking them at 150° C. for one hour.

When a continuous image display test has been carried out for the liquid crystal display element (the alignment films having surface energy of 62 dyn/cm) of comparison example 2 at high temperature of 50° C. and humidity of 80 for 1000 hours by using a black-and-white checker image 10 mm square in the same way as for the aforementioned embodiment. Although no Image-sticking phenomenon has appeared, since the surface energy of the alignment films is too high, moisture is much trapped in the injection port where moisture enters easily and the alignment films are hydrolyzed by this moisture. White or black turbid spots have been occurred at the injection port of the liquid crystal composition within about 700 hours. As a result, the display dignity has been extremely lowered due to defective display.

The present invention is not limited to the aforementioned embodiments and my be changed or modified so long as the substance is not deviated therefrom. For example, where the surface energy is within the range from 51 to 60 dyn/cm, the material of alignment films is not limited and the manufacturing conditions such as the baking temperature and time may be optimized.

Further, the structure of a liquid crystal display element may be also optimized and columnar spacers, for example, may be provided on either of the array and counter substrates. In this case, the same resin layer as that used for the color layer may be utilized as a material of spacers. A transparent or black material to separate one color layer from the the may be used. Further, the color layer may be provided on the counter substrate side. However, where the color filter layer is provided on the counter substrate side, the color filter layer is covered with the common electrode and the dissolution of impurities on the liquid crystal side is reduced considerably. As described in the aforementioned embodiment, however, where the color filter layer is provided on the array substrate side, impurities of the color filter layer are dissolved much on the liquid crystal layer side from the gaps between the patterned pixel electrodes and an image-sticking phenomenon appears easily. As set forth above, the conditions of alignment films in accordance with the present invention can effectively prevent such an image-sticking phenomenon in the even worse case like the latter.

As explained above, according to the present invention, where the surface energy of alignment films is controlled within a proper range, an image-sticking phenomenon due to impurities dissolved into the liquid crystal layer is substantially prevented, and white or black turbid spots of images due to a hydrolysis of the alignment films by moisture is also substantially reduced. As a result, since defective display is eventually prevented, there is provided a liquid crystal display element with good display dignity.

What we claim is:

1. A liquid crystal display element comprising:

a circuit array substrate having pixel electrodes and a resin layer interposed therebetween;

a counter substrate having a common electrode;

a liquid crystal composition charged in a gap between said circuit array substrate and said counter substrate; and first and second polyimide alignment films formed on said pixel electrodes and said common electrode, respectively, said first and second polyimide alignment films which have a surface energy of no less than 51 dyn/cm to prevent an image-sticking phenomenon caused by said liquid crystal composition and impurities contained in said resin layer of said circuit array substrate through said first and second polyimide alignment films, and a surface energy of no more than 60 dyn/cm to prevent white or black turbid spots caused by impurities contained in said liquid crystal component.

2. A liquid crystal display element according to claim 1, wherein said resin layer is a color filter layer.

* * * * *